United States Patent [19]

Benson et al.

[11] Patent Number: 5,394,284
[45] Date of Patent: Feb. 28, 1995

[54] DIRECT ACCESS STORAGE DEVICE HAVING A STABLE BALL BEARING CAGE DESIGN

[75] Inventors: Glenn A. Benson, Rochester; Peter M. Herman, Oronoco; Richard W. Luoma, Rochester, all of Minn.

[73] Assignee: International Business Machines Corp., Armonk, N.Y.

[21] Appl. No.: 959,007

[22] Filed: Oct. 9, 1992

[51] Int. Cl.⁶ ............ G11B 17/02; G11B 23/00; F16C 33/38
[52] U.S. Cl. ............ 360/99.08; 360/98.07; 369/266; 369/269; 384/528
[58] Field of Search .......... 360/98.07, 99.04, 99.08; 369/266, 269; 384/523, 526–529, 533, 534, 520, 521, 522, 524, 525, 530, 531, 532, 49

[56] References Cited

U.S. PATENT DOCUMENTS

| | | | |
|---|---|---|---|
| 1,214,825 | 2/1917 | Richardson . | |
| 2,875,005 | 2/1959 | Blazek et al. | 384/527 |
| 3,922,037 | 11/1975 | Yamada et al. | 308/6 B |
| 4,066,304 | 1/1978 | Johnston et al. | 384/526 |
| 4,386,811 | 6/1983 | Heemskerk et al. | 384/523 |
| 4,505,523 | 3/1985 | Stephan | 384/445 |
| 4,653,938 | 3/1987 | Fenwick | 384/533 |
| 4,715,247 | 12/1987 | Honda et al. | 384/523 |
| 5,132,856 | 7/1992 | Takahashi | 360/98.07 |
| 5,143,459 | 9/1992 | Plutt | 360/98.07 |
| 5,248,203 | 9/1993 | Agari | 384/49 |

FOREIGN PATENT DOCUMENTS

| | | | |
|---|---|---|---|
| 375290 | 7/1907 | France . | |
| 470612 | 9/1914 | France | 384/523 |

*Primary Examiner*—Robert S. Tupper
*Assistant Examiner*—George J. Letscher
*Attorney, Agent, or Firm*—Laurence R. Letson

[57] ABSTRACT

The instability of a cage in a precision ball bearing at high speeds may be eliminated by controlling the position of the cage. The control of a position of a cage is accomplished by forming three ball pockets or holes in the cage for the balls of the ball bearing assembly to a dimension that will result in a tight running fit between the ball and the ball pocket. A tight running fit between the ball and the cage is found in three of the ball pockets in a ball bearing assembly while the diameter of the large ball pockets or other remaining ball pockets is enlarged to provide a clearance between the balls and the cage which is at least twice the clearance between the ball and the guide ball pocket having the tight running fit, and preferably three to five times that clearance. When properly lubricated, the tight running fit will insure stabilization and control of the cage so that the cage remains stable at high rotational speeds.

14 Claims, 4 Drawing Sheets

DIRECT ACCESS STORAGE DEVICE HAVING A STABLE BALL BEARING CAGE DESIGN

FIELD OF THE INVENTION

This invention relates to the precision performance of drive and disk pack of a direct access storage device and the design of ball bearing assemblies and, more particularly, to the cage within the ball bearing assembly which maintains the spacing and distribution of the balls about the annular opening between the races.

BACKGROUND OF THE INVENTION

Data storage requirements for computers have dramatically increased as computers have increased in complexity and the complexity of the applications to which they are applied has increased. With the increasing memory requirements for the data storage, the density of data stored on disks in disk files continues to increase. As the density of data storage increases, extreme precision in fabrication and assembly as well as the operation of the disk drive is required to follow the disk track recorded on a magnetic disk. As these disks are rotated at higher speeds, it becomes ever increasingly difficult to maintain concentricity of the data tracks around the axis of the disk drive. Efforts have been made to utilize precision ball bearings which permit the disks to rotate with minimal energy consumption, disturbance and vibration and as rapidly as may be necessary to store large quantities of data and to be able to retrieve the stored data within short time periods.

As the speeds of the disk files increase and the size of the ball bearings decrease, it has become apparent that the cage contained within the ball bearing assembly has become a significant problem with respect to stability of the bearing and the stability of the spindle, as it rotates about the shaft. This cage insures that the balls within the ball bearing assembly are maintained and spaced from each other and distributed about the bearing races.

Cages within the ball bearings may become unstable and vibrate or develop other undesirable movements within the confines of the bearing, thus adversely affecting the smooth running of the ball bearing.

Although instability in ball bearings may be tolerated with no noticeable loss of performance in non-precision environments, such as slow speed units where vibrations do not affect the spindle to any noticeable amount, the instability of the cage in a high precision, high speed unit can noticeably degrade the performance of the unit within which the ball bearing assembly is installed.

Precision is very important in the high speed applications such as the disk drives where the recording tracks are concentric circles or paths on the disk surface where data has been magnetically recorded. If the disk is not always concentric about the axis of the disk drive, the recording tracks will likewise not be concentric; the effect will be that the recording track wanders or moves relative to the read/write head, which is precisely positioned at a point which should correspond to the midtrack position of a properly operating disk drive disk. When the disk vibrates or rotates with a lack of concentricity, the magnetic head may not follow the track closely enough for writing and reading and it may be impossible to accurately and precisely record data; more importantly, it may be impossible to retrieve data stored on that particular track. With the increase in the memory storage density on a magnetic disk, the disk tracks are placed so close to each other that should any significant vibration or lack of concentricity occur, the read/write head may be positioned over the wrong track, at least momentarily, thus causing a reading or writing error.

Bearing life may not be predictable because of instability of the cage in the ball bearing assembly. The instability may occur early in life due to the lack of proper dimensional control during manufacture or later in life due to wear between the ball and the cage, thereby enlarging the ball pocket.

Instability of the ball bearing assembly cage is caused by random and uncontrolled contact between the balls and the cage, transmitting the force by which the cage is rotated about the axis of the bearing. This contact is not controlled and, therefore, occurs at varying positions around the cage. When the contact driving the cage occurs at varying locations on the cage, there is a discontinuity of force exerted on the cage resulting in the cage being forced forward at differing rates and with different forces at different locations thereby causing the cage to move with irregularity. As the cage moves with irregularity, vibrations are set up which will cause the cage to move in a non-uniform manner and further accentuate the problem since the cage will be in contact with the balls of the ball bearing assembly in an irregular and unpredictable pattern. Once vibrations have been established in the cage, and the cage begins to respond to the vibrations created by the impacting of the cage by balls at different points around the cage in an uncontrolled pattern, the cage will then begin to deviate from its normal path. As the cage deviates from its normal path, the deviations will cause additional vibrations in the other balls in the race of the ball bearing assembly and will inherently transfer some of these vibrations to the spindle which is mounted to the ball bearing assembly.

As these vibrations are transferred to the spindle, the spindle will respond by moving in a direction which will effectively cause the recording tracks on a disk to move radially in and out with respect to the axis of the bearing assembly and the supporting shaft.

SUMMARY OF THE INVENTION

The foregoing problems and disadvantages associated with the prior art ball bearing assemblies may be overcome by this invention.

Accordingly, it is an object of this invention to tightly constrain the clearance between selected balls of a ball bearing assembly and the cage pocket in such a manner that the forces driving the cage are distributed about the circumference of the cage at selected and defined points.

It is a further object of the invention to eliminate undesirable vibrations and deviations from the normal movement path of the cage in a ball bearing assembly.

An additional object of the invention is to provide a power savings in a precision ball bearing assembly while eliminating undesirable vibrations and deviations in the movement of the cage.

The invention described in this application is a disk drive or direct access storage device (DASD) with an improved precision ball bearing assembly that substantially eliminates the instability of the disks of the drive associated with cage instability where uncontrolled and random impacts of the balls of the bearing striking the cage.

The foregoing objects may be accomplished in a ball bearing assembly by tightly constraining the balls in a limited number, preferably three, of guide pockets in the cage. The pockets are formed by holes extending through the cage which permit the ball bearing ball to be inserted into the pockets and to extend and engage with the inner and outer races.

By constraining the ball in a manner which produces a tight running fit, the ball is not permitted to move in an uncontrolled manner and will tend to move the cage about the axis of the ball bearing assembly in a smooth, uniform manner.

In order to eliminate the effects of other balls randomly engaging the cage in such a manner that vibrations are produced, the pockets for the remaining non-guide balls are enlarged to provide a substantially larger clearance between the balls of the ball bearing assembly and the pocket in the cage.

By enlarging the clearance for the remaining balls, the conditions, which may be referred to as boundary conditions, are controlled; thus, undesired vibrations and movements of the cage may be significantly eliminated or at least limited.

Also, by enlarging the pockets for some of the ball bearings, a power reduction is achieved.

The diameter of all balls in a particular ball bearing assembly are selected to be identical. The clearance between the ball and the guide pocket is preferably a tight running fit which permits only a thin layer of lubrication between the ball and the guide pocket or hole in the cage.

To better understand the invention, reference is made to the drawings and the detailed description of the invention to follow.

DRAWINGS

DETAILED DESCRIPTION OF THE INVENTION

Figure 1:
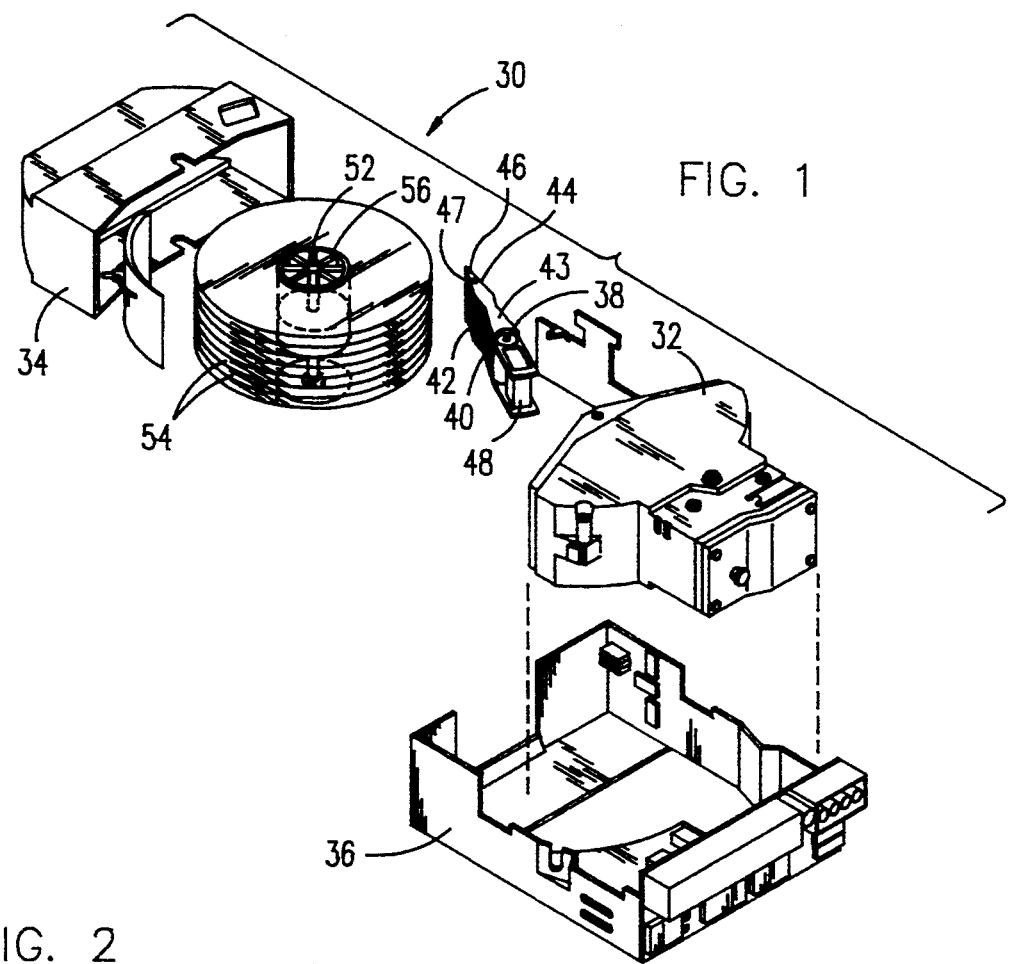
FIG. 1 illustrates in partially exploded form, a DASD including a ball bearing assembly having a stable cage.

The disk drive 30 is shown in partially exploded form in FIG. 1. The disk drive 30 includes a housing 32, and a housing cover 34 which after assembly, is mounted within the frame 36. Rotatably attached within the housing 32 on an actuator shaft 38 is an actuator arm assembly 40. The actuator arm assembly 40 includes an E block or comb like structure 42 having a plurality of arms 43. The arms 43 support load springs 44 and sliders 46. Slider 46 in turn supports or carries magnetic transducer 47. The actuator arm assembly 40 is further provided a voice coil 48 on the end of the assembly 40 opposite to the arms 43, which is used to control the position of the actuator arm assembly 40, about shaft 38 and relative to disks 54. Disks 54 are typically mounted onto the exterior cylindrical surface of a motor shell 60 or on a member which is then attached to the outer shell 60.

Figure 2:
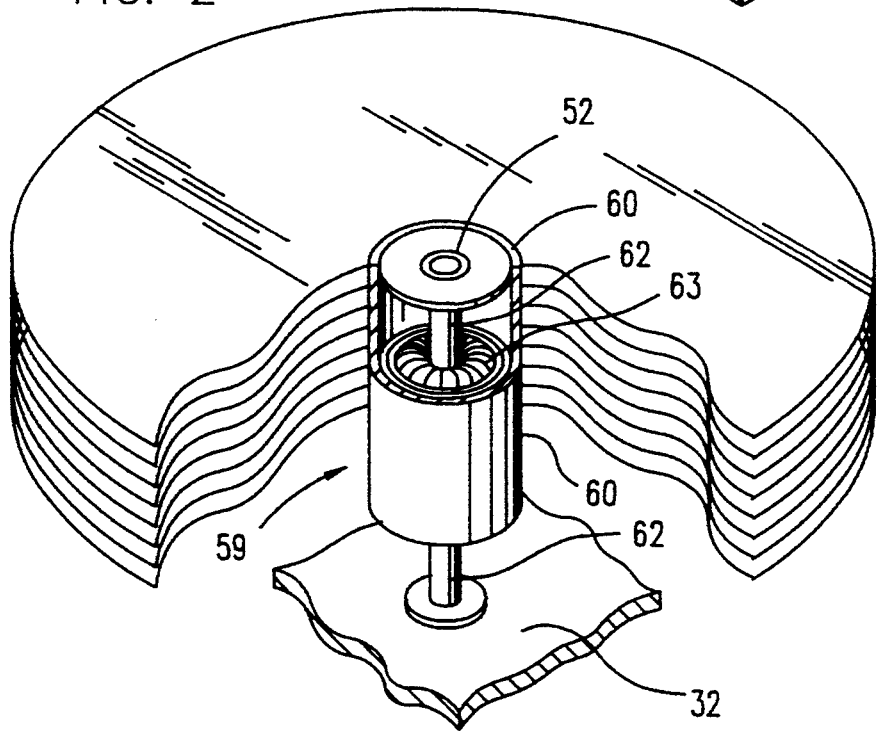
FIG. 2 is an illustration of the drive motor of the disk drive illustrating the location of at least one such bearing with a stable cage design in the disk pack and drive motor assembly.

Referring now to FIG. 2, the motor for driving the pack of disks 54 is typically mounted with the shaft 62 and rigidly mounted in the housing 32. The outer shell 60 of the motor and the magnets supported therein in a conventional manner, but not shown, are free to rotate about the shaft 62 and windings 63. With the shell 60 supporting the disks 54 in a pack or assembly, the disks 54 will rotate in response to the operation of the electric motor.

The shaft 62 of the motor 59 must support the outer shell 60 of the motor 59 and any members attached to the shell 60. In addition to the support provided by the shaft, the shell 60 and more specifically the disks 54 must be constrained to rotate about the shaft with as close to concentricity with the shaft as is possible. The bearings 52 must not only reduce the friction of rotation, but must also constrain the disks 54 from making unwanted excursions away from concentricity with the axis of the shaft 62.

Precision ball bearing assemblies that have been used in DASD have relied on extremely close tolerance control to insure concentricity. The present invention is a direct access storage device with an improved design precision bearings to eliminate the source of perturbations of the disks 54 the unstable movement of the cage 16 of the ball bearing assembly 52.

Figure 3:
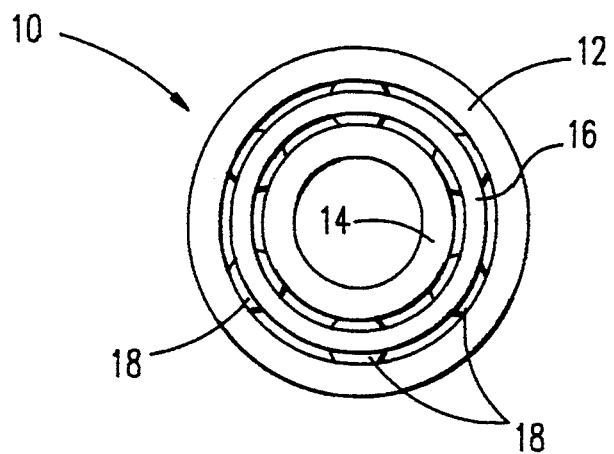
FIG. 3 illustrates a ball bearing assembly including an inner and outer races, ball bearings and a cage.

Referring now to FIG. 3, the ball bearing assembly is comprised of an outer race 12 formed in a substantially annular cylindrical form and having an inner bearing 14 surface upon which balls 18 will roll.

To maintain the balls 18 in a spaced relationship to each other and distributed about the circumference of inner race 14, a cage 16 is provided. The cage 16 is substantially an annular ring member having a height greater than the diameter of the balls 18 being guided and having holes 20, 22 formed through the cage 16 in a substantially radial direction. The holes 20, 22 extending through the cage 16 may be formed in any convenient manner, but preferably will form a semi-spherical pocket in the material of the cage 16. The diameter of the cage 16 will be dictated by the amount of space between the inner race 14 and the outer race 12 of the bearing assembly. There are typically three types of cages that are conventional in ball bearing assemblies, inner race guided cages, outer race guided cages and ball guided cages. The improvement in cage design disclosed in this invention is applicable to all three of the cage designs.

The inner race and outer race guided cages are constrained by lubricated contact between the appropriate guiding race and the mating cage surface. Ball guided races rely on additional cage pocket geometry which trap the balls within the pockets and prevent the cage from excursion to the point where the cage would approach the inner and/or outer races.

Figure 4:
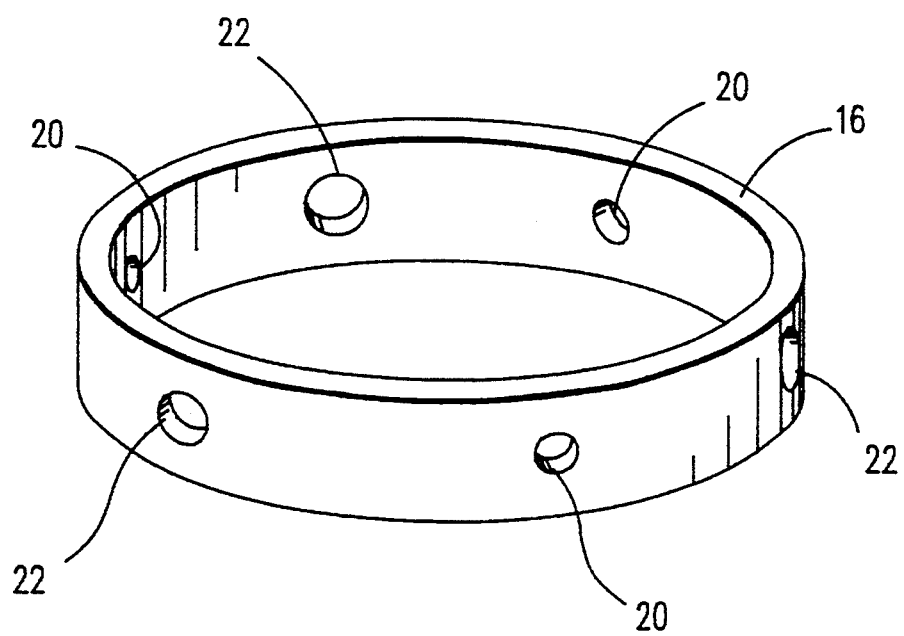
FIG. 4 illustrates a view of the cage of the ball bearing assembly of FIG. 3 positioned so that the ball pockets of the cage are observable and illustrates, in an exaggerated manner, the size relationship of the guide pockets to all other ball pockets.

The holes extending through the cage 16 are referred to as ball pockets 20, 22 shown in FIG. 4. The ball pockets 20, 22 of the present invention are divided into two different types, small ball pockets or guide ball pockets 20 and large ball pockets or other ball pockets 22.

Typically, the cage 16 will carry three small ball pockets 20, substantially equally distributed about the circumference of the ring, forming cage 16. The remaining large ball pockets 22 are positioned intermediate the guide ball pockets 20 as evenly as possible.

Not all ball bearings have numbers of balls which are divisible by three. Accordingly, for example, in cases where a ball bearing assembly has seven or eight balls total, the balls all will be equally distributed about the circumference of the cage 16 and ball pockets 20, 22 will be created to accommodate that distribution. However, due to the fact that the number of balls that need to be distributed between adjacent guide balls 18 will dictate that the small ball pockets 20 will not be equally distributed about cage 16. This distribution, although not equal, is still acceptable so long as the angular displacement between adjacent guide ball pockets 20 does not exceed 170°. For example, for an eight ball ball bearing assembly, the distribution of the guide ball pockets would result in an angular displacement between adjacent guide ball pockets 20 of 135°, 90° and 135°.

Figure 5:
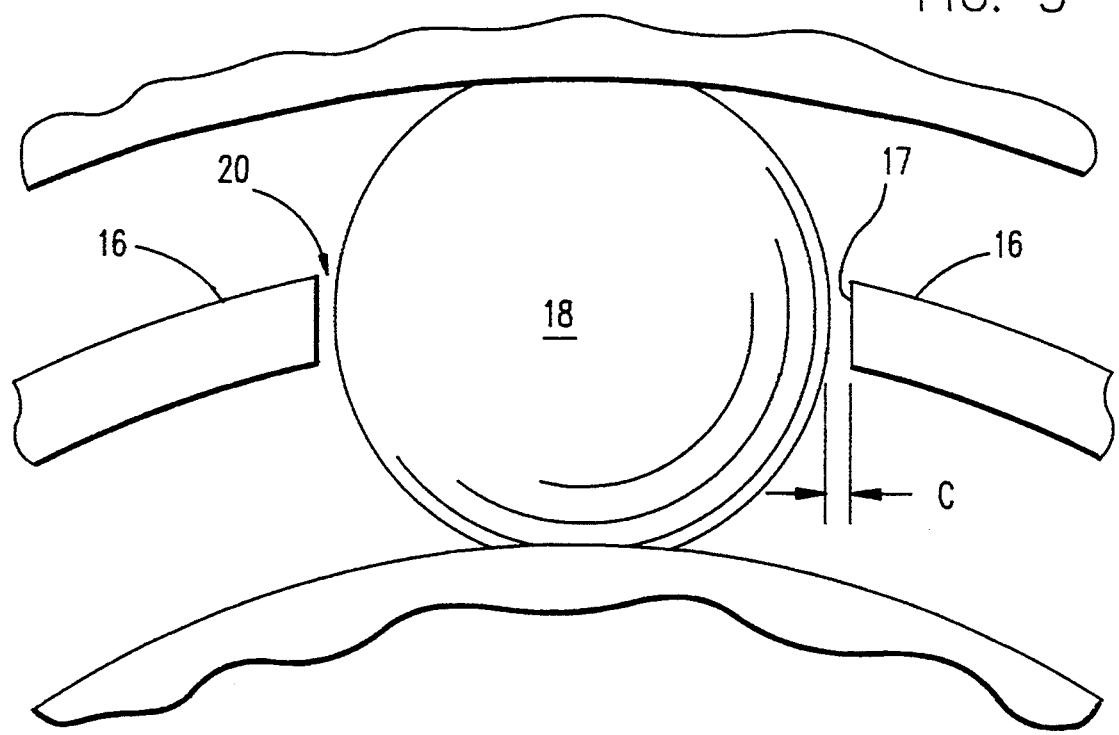
FIG. 5 is an enlargement of a portion of FIG. 3 illustrating the relationship between the ball bearing and the cage, when the ball bearing and cage are constrained between the inner and outer races of the bearing assembly.

Once the angular displacement between adjacent guide ball pockets 20 is determined, the guide ball pockets 20 must be accurately formed in cage 16. The objective of controlling the cage 16 is accomplished by forming the guide ball pocket 20, illustrated in FIG. 5, so that the static clearance designated as C is sufficiently small to create a tight running fit between ball 18 and cage 16. When a tight running fit is formed between ball 18 and cage 16 and the ball bearing, assembly is properly lubricated, a thin surface film of lubrication will form between the surface of ball 18 and the end surface 17 of cage 16. An example of a dimensional relationship for such a ball 18 and pocket 20 would be that if a ball 18 of 2 mm diameter is selected for the ball bearing, the diameter of the guide pocket 20 would be 2.1 mm plus or minus 0.05 mm in diameter. Thus, the clearance C would be nominally 0.05 mm, half of the 0.1 mm difference in diameters.

Figure 6:
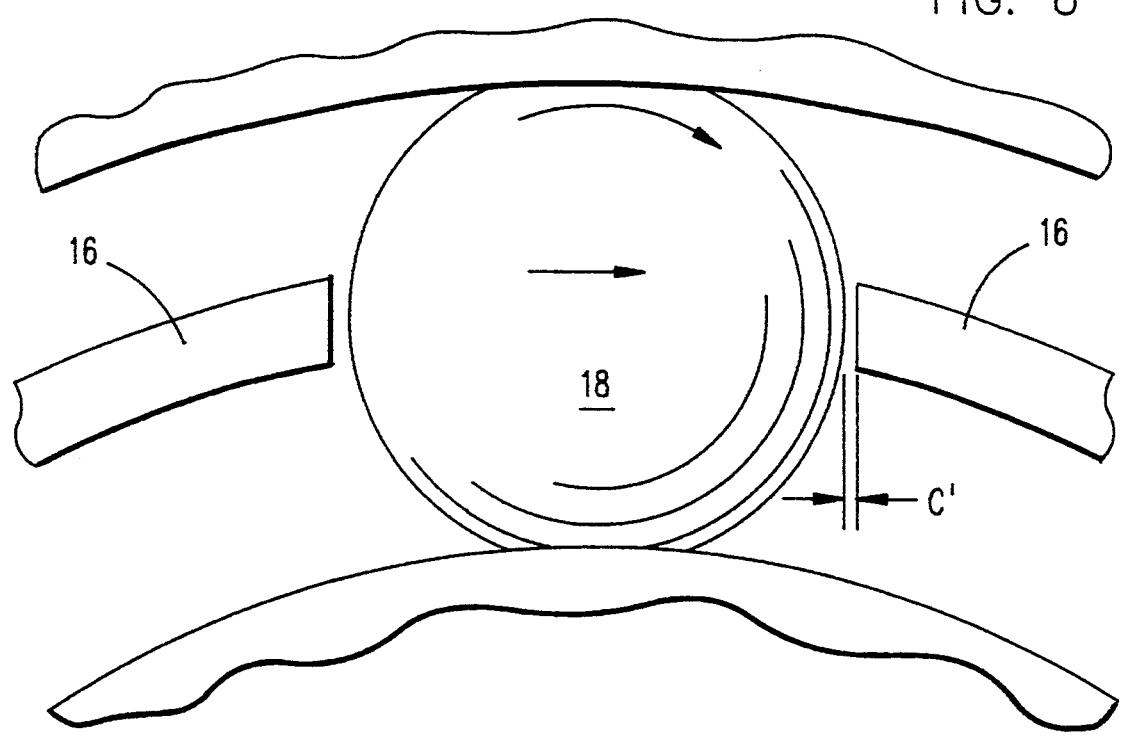
FIG. 6 illustrates the positioning of the ball relative to the cage during a period when the inner and outer races are rotating relative to each other.

During movement of the bearing, and particularly during the rotation of the outer race 12 relative to the inner race 14, ball 18 will be rotated in a clockwise direction, as illustrated in FIG. 6. The effect of this rotation of ball 18 will be to cause the center of the ball to progress rightward, in FIG. 6, while being constrained to follow the circular path defined by the inner race 14 and outer race 12. As ball 18 is caused to translate rightward as indicated by the arrow extending from the center point of ball 18, the clearance C' will be reduced by some small amount. The amount of reduction will be determined by the type and quantity of lubrication utilized in the bearing, but there will be no actual surface-to-surface contact between the ball 18 and cage 16. As the balls rotate, a replenishment of the lubricant is pulled into the clearance between cage 16 and ball 18. As the lubrication is replenished, the gap between ball 18 and cage 16 will tend to be equalized around ball 18 and the varying of the gap will be resisted. In view of the fact that the clearance C in FIG. 5 under static conditions approximates 0.05 mm or approximately 0.002 inches, clearance C will be fully filled with the lubricating film. As the ball 18 rotates and translates rightward and C' is diminished, as in FIG. 6, the pressure of the film of lubrication against face 17 of cage 16 will cause cage 16 to move rightward. Since the openings or guide ball pockets 20 are tightly controlled with respect to dimensions and tolerance, the other two guide balls will be acting at the same time with substantially identical movement and forces onto cage 16 and will cause cage 16 to be moved about the axis of the ball bearing assembly 10.

Figure 7:
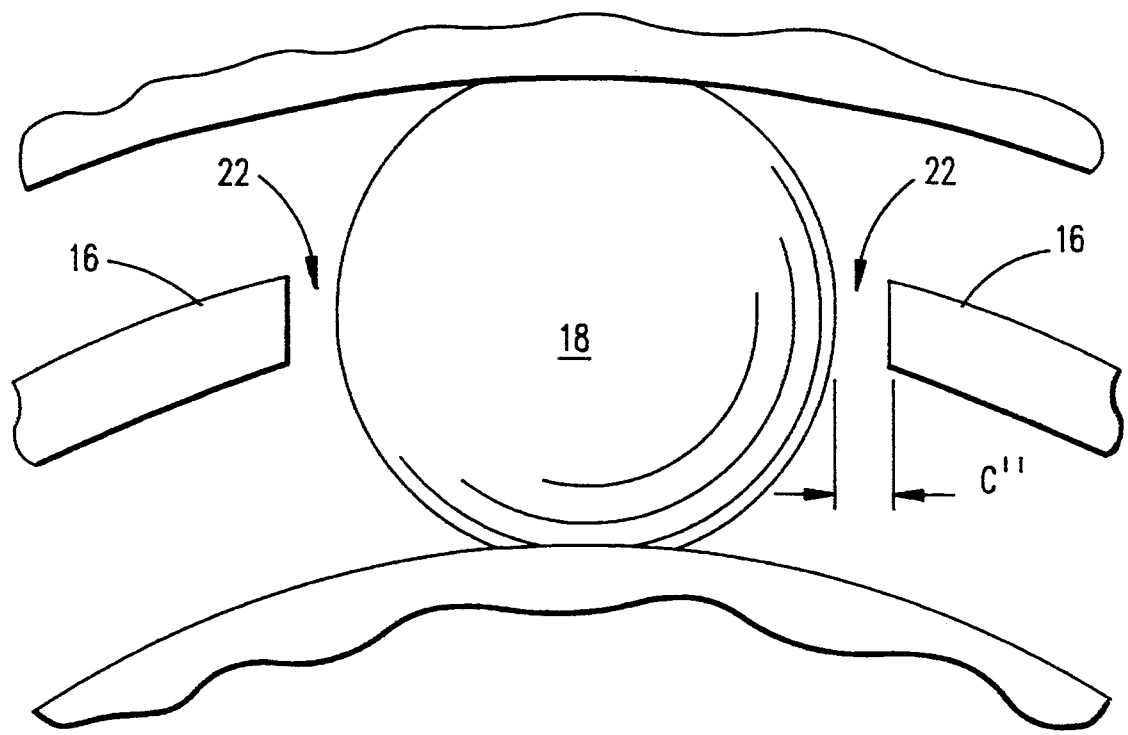
FIG. 7 illustrates the clearance between one of the balls and the larger pocket of the cage.

In order to complete the desired effect of the invention, the other large pockets 22 are likewise formed into race 16 by punching or other suitable manufacturing process. The relationship of the clearance between ball 18 and cage 16 at the large ball pockets 22 is best seen in FIG. 7. Clearance C" in FIG. 7 is dimensioned so that the clearance C" is at least twice the clearance C in the guide pocket. It is preferred that the clearance C" be three to five times the clearance C found in the guide ball pockets 20. The upper limit of the number of times that the clearance C" may be a multiple of clearance C is limited only by the fact that as the large ball pocket 22 increases in size, it will eventually destroy the integrity of cage 16. As the pocket size increase, the large ball pocket 22 will approach or equal the width of cage 16.

Tightly constraining the cage 16 to the ball 18 insures that the cage 16 is not free to move in random and undesired directions. The enlarging of the clearance C" in the large ball pockets 22 permits the free movement of ball 18 within pocket 22. Should ball 18 impact the edge of pocket 22 during the rotation of the outer race 12 of bearing assembly 10, the tight constraints on the cage 16 by balls 18 will prevent the cage 16 from reacting in an uncontrolled manner and losing stability. It has been found that stability cannot be maintained in a satisfactory manner with only two guide balls, and that the desired affect begins to diminish as the number of guide balls increases beyond the number of three. The preferred number of guide balls and therefore, associated guide pockets 20 would be three. As the number of guide balls increase from three, the benefits diminish, but are still significant for assemblies having no more than one third of the total ball count in guide ball pockets with tight running fits.

It should be understood that the cage 16 illustrated in the drawings is illustrated only as a single piece of material formed into an annular ring. As illustrated, the cage 16 would tend to be free to move relative to the ball 18 and in a direction closer to and away from the races 12, 14. However, it should be understood that the openings of the pockets 20, 22 may be manufactured in any conventional manner to stabilize the cage 16 so that its path is a circle of constant radial distance from the axis of inner race 14. This may involve the forming of retaining flanges such as are illustrated in U.S. Pat. No. 3,922,037 to Yamada, et al. Alternatively, the fabrication of the cage may involve the attaching of additional layers of material either interior to or exterior to cage 16 and, having holes of a smaller diameter, thus trapping the ball 18 in the desired relationship with cage 16, that being the cage 16 center line passing through the center of ball 18. While precise dimensioning of the parts will be apparent to one of skill in the art, the dimensional relationship between the ball diameter and the different diameters of the guide pocket 20 and the large ball pocket 22 are important to the successful operation of the precision ball bearing at high speeds where undesired vibrations resulting from the lack of stability of the cage may be controlled and substantially eliminated.

We claim:

1. A ball bearing assembly comprising:
   an inner race;
   an outer race circumscribing said inner race and forming an annular region between said inner and outer races;
   a plurality of balls of substantially identical diameters, disposed within said annular region intermediate said inner and outer races and further disposed in a single row circumscribing said inner race;
   a cage circumscribing said inner race and intermediate said inner and outer races, said cage comprising a plurality of circular holes extending radially through said cage forming a plurality of pockets, one said pocket for each of said balls;
   said plurality of said holes comprising a first plurality and a second plurality of holes, said first plurality of said holes each having a diametral dimension to form a tight running fit with one of said balls, said hole and said ball forming a clearance therebetween;
   said second plurality of said holes each having a diametral dimension creating a clearance at least twice said clearance in said first plurality of holes, whereby said cage is controlled in movement by said balls in said first plurality of said holes.

2. The ball bearing assembly of claim 1 wherein said first plurality of said holes is three in number.

3. The ball bearing assembly of claim 2 wherein said plurality of holes are disposed at locations uniformly distributed about said cage with said first plurality of holes disposed at said locations and as equally distributed about said cage as possible.

4. The ball bearing assembly of claim 1 wherein said first plurality of said holes are distributed about said cage with the angular displacement between adjacent holes of said first plurality of said holes not greater than 160 degrees.

5. The ball bearing assembly of claim 1 wherein said first plurality of said holes is at least three in number.

6. The ball bearing assembly of claim 5 wherein said first plurality of said holes are distributed about said cage with the angular displacement between adjacent holes of said first plurality of said holes not greater than 160 degrees.

7. The ball bearing assembly of claim 6 wherein said plurality of holes are disposed at locations uniformly distributed about said cage with said first plurality of holes disposed at said locations and as equally distributed about said cage as possible.

8. The ball bearing assembly of claim 5 wherein said plurality of holes are disposed at locations uniformly distributed about said cage with said first plurality of holes disposed at said locations and as equally distributed about said cage as possible.

9. The ball bearing assembly of claim 1 wherein said plurality of holes are disposed at locations uniformly distributed about said cage with said first plurality of holes disposed at said locations and as equally distributed about said cage as possible.

10. A direct access storage device for storing and/or retrieving information at information sites on rotating disks by altering the physical characteristics of said disks, comprising;
    an electrical motor having a rotational member and a stationary member;
    a frame supporting said stationary member of said motor;
    at least a storage disk drivingly supported by said rotational member or said motor;
    an access assembly mounted on said frame for movement relative to said motor, for accessing said information sites on said disk;
    said rotational member of said motor supported on and rotatable relative to said stationary member of said motor by at least a ball bearing assembly;
    said ball bearing assembly further comprising at least an inner race;
    an outer race circumscribing said inner race and forming an annular region between said inner and outer races;
    a plurality of balls of substantially identical diameters disposed within said annular region intermediate said inner and outer races in a single row circumscribing said inner race;
    a cage circumscribing said inner race and intermediate said inner and outer races, said cage comprising a plurality of circular holes extending radially through said cage forming a plurality of pockets, one said pocket for each of said balls;
    said plurality of said holes comprising a first plurality and a second plurality of holes, said first plurality of said holes each having a diametral dimension to form a tight running fit with one of said balls, said hole and said ball forming a clearance therebetween;
    said second plurality of said holes each having a diametral dimension creating a clearance at least twice said clearance in said first plurality of holes, whereby said cage is controlled in movement by said balls in said first plurality of said holes.

11. The direct access storage device of claim 10 wherein said first plurality of said holes is three in number.

12. The direct access storage device of claim 11 wherein said plurality of holes are disposed at locations uniformly distributed about said cage with said first plurality of holes disposed at said locations and as equally distributed about said cage as possible.

13. The direct access storage device of claim 10 wherein said first plurality of said holes are distributed about said cage with the angular displacement between adjacent holes of said first plurality of said holes not greater than 160 degrees.

14. The direct access storage device of claim 10 wherein said plurality of holes are disposed at locations uniformly distributed about said cage with said first plurality of holes disposed at said locations and as equally distributed about said cage as possible.

* * * * *